United States Patent [19]

Gregoire et al.

[11] 4,419,721

[45] Dec. 6, 1983

[54] SEARCHLIGHT WITH MODULAR CONTROL MECHANISM

[75] Inventors: Brian R. Gregoire, Brookfield; Rupert O. Yantz, West Bend, both of Wis.

[73] Assignee: Phoenix Products Company, Inc., Milwaukee, Wis.

[21] Appl. No.: 332,404

[22] Filed: Dec. 21, 1981

[51] Int. Cl.³ .............................................. B60Q 1/00
[52] U.S. Cl. .................................... 362/368; 362/61; 362/66; 362/80; 362/269; 362/270; 362/273; 362/285; 362/287; 362/289; 362/399; 362/418; 362/419; 362/422; 362/423; 362/424; 362/425; 362/427; 362/428
[58] Field of Search ..................... 362/61, 66, 80, 269, 362/270, 273, 285, 287, 289, 368, 399, 418, 419, 422, 423, 424, 425, 427, 428

[56] References Cited

U.S. PATENT DOCUMENTS 2,574,211 11/1951 Hill ...................................... 362/422
4,298,911 11/1981 Headrick ........................ 362/272 X
4,344,117 8/1982 Niccum ........................... 362/384 X Primary Examiner—Stephen J. Lechert, Jr.
Attorney, Agent, or Firm—Quarles & Brady

[57] ABSTRACT

A control system for positioning a searchlight (2) in azimuth and elevation including an upper torque tube (34) and a lower torque tube (39) which are coupled together; an upper push rod (46), push rod coupling (50) and lower push rod (54) which are coupled together; and control elements (65, 90 & 93, 100) operative to rotate the lower torque tube and also operative to reciprocate the lower push rod.

12 Claims, 5 Drawing Figures

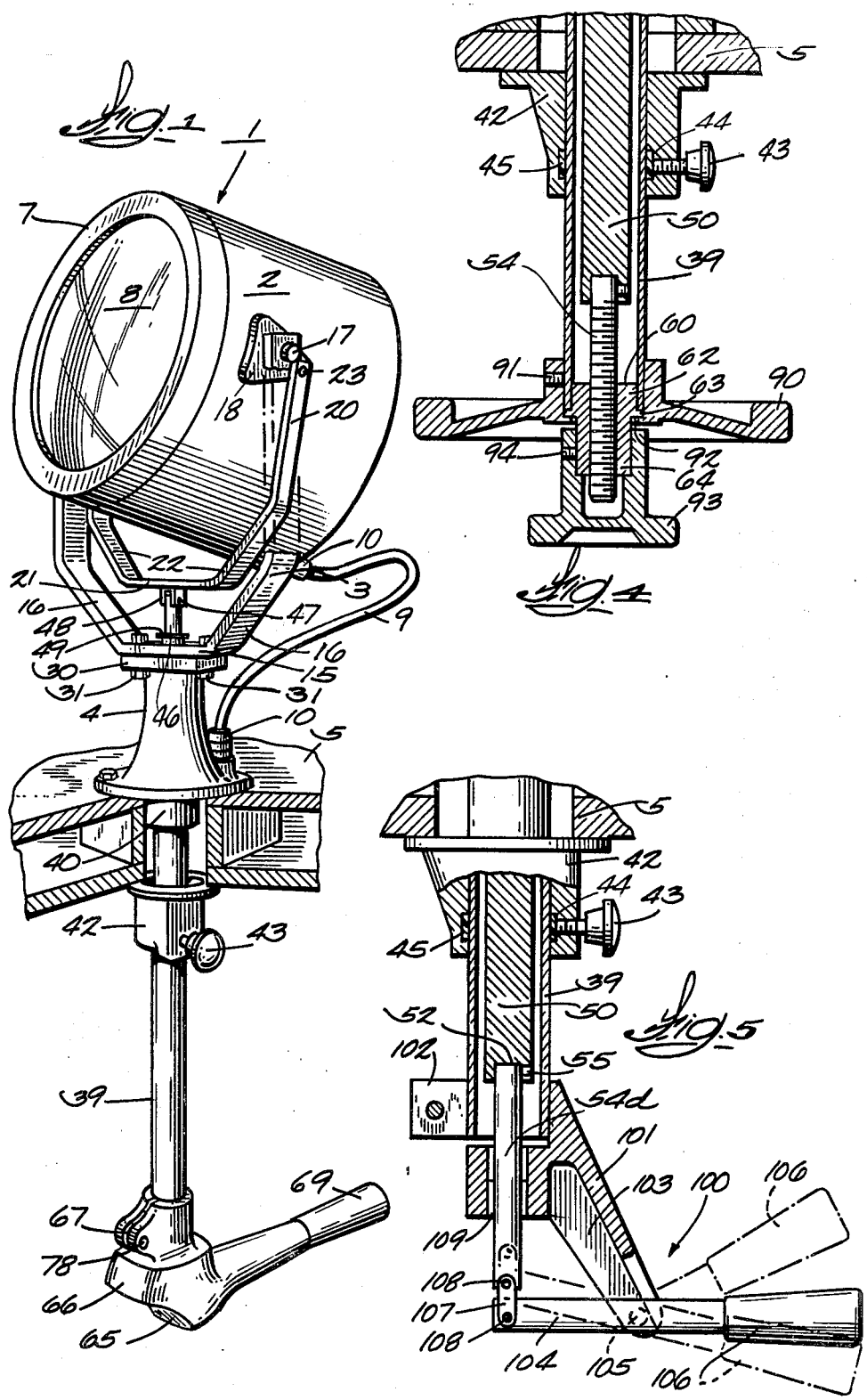

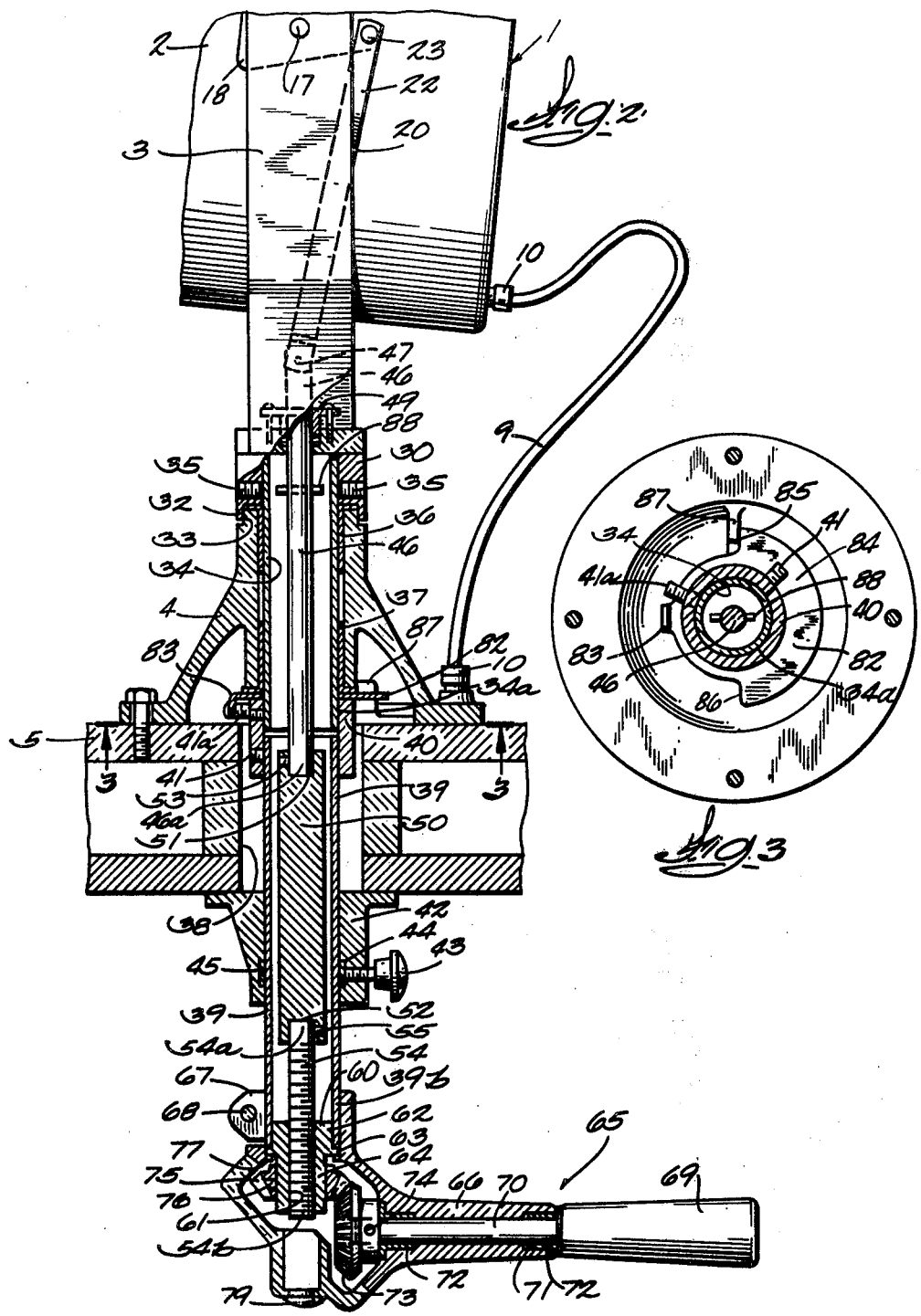

SEARCHLIGHT WITH MODULAR CONTROL MECHANISM

TECHNICAL FIELD

This invention relates to searchlights incorporating a control mechanism adapted for positioning the light with respect to azimuth and elevation.

BACKGROUND ART

Searchlights are most often employed in installations that require a control mechanism so that an operator can move the searchlight over an area to be searched or aim it at a specific object. A suitable control system must be able to allow positioning the searchlight horizontally (azimuth) and vertically (elevation). For example, in the marine field tugs pushing or towing barges such as on the Mississippi River need searchlights that the operator can control in azimuth in order to sweep from bank to bank across the river and also control in elevation so as to be able to sweep at various distances from the boat.

We are aware of three mechanical systems presently in use for controlling the positioning of a searchlight:

(1) Lever control—a single lever is connected to an inner push rod that can be moved up or down vertically to control elevation of the light and also connected to an outer tubular shaft that can be rotated in order to turn the searchlight in azimuth.

(2) Lever-gear control—a single lever at one end of the control assembly is connected through bevel gears to an inner shaft having a pinion gear on its opposite end which meshes with a curved rack externally attached to the searchlight; elevation of the light is controlled by twisting the lever. The lever is also connected to an outer tubular shaft to rotate the light in azimuth, as in the lever control system.

(3) Wheel-control—two hand wheels are incorporated in the control mechanism. One wheel controls the vertical positioning of the searchlight through the pinion and curved rack arrangement described above for the lever-gear control system. The other wheel rotates an outer shaft for horizontal positioning of the light as in both the lever and lever-gear control systems described above.

Searchlights with one or the other of the above control systems have been sold for many years by several companies that are well-established in this field, including for example, The Carlyle & Finch Co., Perko Inc. and ITT Jabsco Products. The impetus for the present invention is our conviction that the commercially-available searchlights can be improved upon with respect to their control systems in such manner as to provide significant advantages to the manufacturer, distributors and users of the searchlights, and we therefore developed the new design that is the subject of this invention. A principal object of this invention was to provide a new searchlight control mechanism that will allow azimuth and elevational positioning of the light.

One of the problems we became aware of during the course of our research in connection with this invention was that the available searchlights were limited to one or the other of the above three control mechanisms. That is, a searchlight that was purchased with a lever control system could not later be converted to either a lever-gear or double wheel control system without substantial expense, so that any such conversion was impractical. This meant that the purchaser of a searchlight had to make an early choice of one of the three control mechanisms. If, for example, a new operator was selected for a boat at a later date who preferred a different control system, the only solution was to replace the entire light with a different searchlight. Also, a manufacturer had to build an inventory of searchlights with all three control systems if it wanted to be able to fill orders quickly, or else construct a light only after receiving an order which would often result in long delays of shipment to the customer. Therefore, another object of our present invention was to provide a searchlight in which the three types of control mechanisms were readily interchangeable with one another, most usefully interchangeable in the field (i.e. after having been installed on a ship or other environment), to thereby eliminate the problems of changing the control mechanism after the initial installation and reducing manufacturer and distributor problems with respect to inventories.

Another problem we found with the commercially-available searchlights is that the lever-gear and wheel control systems described above both require a pinion and a curved rack to be mounted outdoors inasmuch as the rack is attached to the searchlight housing and the pinion must mesh with the rack. This subjects these gear elements to adverse weather conditions, such as ice or snow accumulation, as well as potential damage by being struck with an object. Also, maintenance and adjustment are more difficult due to the outdoor location of these parts. Accordingly, another main object of our present invention was to devise a control mechanism for a searchlight that can include either a lever-gear type of control or a wheel type of control but which does not utilize an exteriorly mounted rack or pinion; a related feature was to develop a design in which the elements were protected from the weather and easily available for inspection and maintenance.

Another problem we noted with the commercially-available searchlights is the difficulty of customizing the units with respect to the lengths of the shafts employed for the control systems. For example, a searchlight will customarily be mounted on top of a cabin roof or other ship superstructure and have control shafts extending into the interior to position the levers or wheels at a convenient height so that an operator can easily handle the controls. This in turn means that the control shafts associated with the light will need to be available in varying lengths in order to be adapted or customized to a specific installation. The inner shaft of a searchlight incorporating either the lever, lever-gear or wheel control system has typically been a single solid shaft of a customized length chosen to position the controls at the appropriate height. Also, the outer tubular shaft in these control mechanisms is a single piece of tubing of the length required for the selected height. This causes problems for the manufacturer because it is not practical to maintain an inventory of these shafts in all the possible lengths that specific customers may require. The inventory problem also adversely affects the distributors and installers of the searchlights. Moreover, the user of the equipment has a disadvantage in that he cannot change the length of these shafts after the initial installation, so that a new operator who may require a different height for the controls than the first operator cannot be readily accommodated. Thus, another main object of our present invention was to provide a control mechanism for searchlights that would allow facile adjustment of the length of the control shafts by the manufacturer, installer or user, as well as in the field after the initial installation.

In addition to the foregoing objectives, we have also sought to provide other useful objectives during the course of our research and development in connection with the new searchlight system about to be described: a control system with low friction so as to thereby permit easy adjustment of the positioning of the searchlight; a control system that would be self-locking in elevation to thereby facilitate positioning of the light and eliminate the need for a lock to prevent movement of the light because of vibration, pitching of a boat, etc; a control system that was relatively simple in design so as to provide a reliable unit without undue cost; a control system that incorporated fine control of the positioning of the light; and a control mechanism having low wear and with critical elements enclosed and lubricated so as to be relatively simple to maintain and repair. These and other objects will become apparent from the description which follows.

DISCLOSURE OF THE INVENTION

Our new searchlight control mechanism includes (1) an elevation yoke and an azimuth yoke attached to a searchlight, (2) an upper torque tube connected to the azimuth yoke and an upper push rod connected to the elevation yoke, the upper torque tube comprising a hollow shaft and the upper push rod being positioned inside thereof, (3) a lower torque tube connected to the upper torque tube, (4) a push rod coupling connected to the upper push rod, and (5) a lower push rod connected to the push rod coupling. Control elements for positioning the light are operatively connected to the lower torque tube and the lower push rod. The lower push rod comprises either a shaft with a threaded end that is received in an axially-restrained threaded nut when the searchlight is to have a lever-gear or wheel control system, or a shaft with an unthreaded end when the light is to have a lever control system, the two types of lower push rods being interchangeable with one another. Adjustment for positioning the control elements at the desired distance from the searchlight is readily accomplished by changing the length of the lower torque tube and the length of the push rod coupling. Either the lever control system, lever-gear control system, or wheel control system can be accommodated by simple interchange of units associated with the lower torque tube and lower push rod.

DRAWINGS

The searchlight control mechanism of the present invention is described hereinafter in full and concise detail sufficient to enable those skilled in the art of designing and constructing searchlights to practice the same by reference to the accompanying drawings in which:

FIG. 1 is a perspective view of a searchlight incorporating a lever-gear control mechanism of the present invention;

FIG. 2 is a sectional view of the searchlight of FIG. 1;

FIG. 3 is a horizontal sectional view of the searchlight taken along the plane of line 3—3 of FIG. 2;

FIG. 4 is a partial sectional view of the searchlight with a wheel control mechanism interchanged for the lever-gear system shown in FIGS. 1 and 2; and FIG. 5 is a partial sectional view of the searchlight with a lever control mechanism interchanged for the lever-gear control mechanism of FIGS. 1 and 2.

BEST MODES FOR CARRYING OUT THE INVENTION

(a) Description of FIGS. 1-3

The searchlight 1 illustrated in FIGS. 1-3 includes a light housing 2, a horizontally rotatable azimuth yoke 3, and a pedestal 4. The pedestal 4 is attached to a structural element 5 on which the light may be mounted, such as a deck or cabin roof of a ship. The light housing 2, which may be a sheet metal or cast unit, contains any suitable type of light bulb, such as an incandescent light or a sealed beam quartz halogen light. A cover closes the front end of the light housing and includes an annular ring 7, which may be secured to the housing 2 by a hinge or clamping screws, not shown, to allow easy removal of the cover for relamping when necessary, and a central glass panel 8. The light in the housing is powered through electric wire 9 attached to the housing and pedestal through fittings 10 and connected to a suitable source of power; the electric wire 9 should have sufficient slack to permit horizontal and vertical movement of the light housing as described below.

The azimuth yoke 3 includes a horizontal central portion 15 and a pair of vertical arms 16, one such arm extending from each end of the central portion. The light housing is pivotally attached between the upper ends of the arms 16 by means of pivot pins 17 threaded into mounting pads 18 on each side of the housing (see FIG. 2); the pivot pins preferably are mounted in suitable bushings, not shown, to permit free vertical rotation of the light housing 2 relative to the azimuth yoke 3.

An elevation yoke 20, including a horizontal central portion 21 and a pair of vertical arms 22, one such arm extending from each end of the central portion, is positioned inside the azimuth yoke 3. The arms 22 of the elevation yoke are secured to the housing by means of bolts 23 threaded into the mounting pads 18 and positioned slightly behind the pivot pins 17.

The azimuth yoke 3 is secured to a flange 30 by bolts 31 extending between the flange and the central portion 15 of the yoke. As best shown in FIG. 2, the flange 30 includes an inner hub portion 32 along its lower end that fits about a shaft portion 33 extending from the upper end of the pedestal 4. The flange 30 is arranged so as to be rotatable about the shaft portion 33 of the pedestal for horizontal movement of the light housing 2. The flange and pedestal thus combine to form a support base for the searchlight.

A hollow or tubular upper torque tube 34 extends through a central aperture in the flange 30 and is connected to the flange by means of set screws 35. The upper torque tube 34 is journalled within a central bore of the pedestal 4, and sleeve bearings 36 and 37, such as of molded plastic or other suitable material, may be employed to reduce the friction between the upper torque tube and the central bore of the pedestal. The connection of the upper torque tube in this fashion is such that rotation of the torque tube will be transmitted through the flange 30 to turn the azimuth yoke 3 in order to rotate the searchlight in the horizontal plane.

Just underneath the base of the pedestal 4, and within an aperture 38 extending through the supporting structure 5, a hollow or tubular lower torque tube 39 is connected to the upper torque tube 34 by means of an annular coupling ring 40 with set screws 41 securing the upper and lower torque tubes to the coupling ring. The lower torque tube 39 extends below the supporting structure 5, and control elements are to be secured to its lower end as will be fully described below.

A collar 42 may be positioned about the lower torque tube 39 underneath the supporting structure 5 and includes a threaded locking knob 43 which can be tightened against the lower torque tube when it is desired to lock it into position against rotation. We have found it useful to employ an annular band 44 of plastic material, such as nylon, between the end of the threaded portion of the locking knob 43 and the lower torque tube, to eliminate metal-to-metal contact at this point. The annular band 44 is retained in a groove 45 formed inside the collar 42. The annular band 44 acts both as a brake band to hold the lower torque tube in the desired position and a bearing, and thus provides an effective intermediary element between the lower torque tube 39 and the locking knob 43.

An upper push rod 46 is connected to the central portion 21 of the elevation yoke 20 along a pin 47 extending between the arms of a U-shaped bracket 48 attached to the lower surface of the yoke. The upper push rod 46 extends downwardly through a central aperture formed in the azimuth yoke 3 and is positioned inside the hollow upper torque tube 34, with its lower end 46a positioned below the lower end 34a of the upper torque tube. The aperture in the azimuth yoke 3 through which the upper push rod 46 extends is sealed with a moisture seal 49 secured to the yoke, which may retain a suitable packing material in order to prevent the entrance of water through the aperture.

There is further provided a push rod coupling 50, comprising a solid shaft having a recess 51 opening upon its upper end and a recess 52 opening upon its lower end. The lower end portion 46a of the upper push rod fits into the recess 51 at the top of the push rod coupling 50, and set screw 53 secures the upper push rod to the push rod coupling. A lower push rod 54 has its upper end portion 54a seated in the recess 52 at the lower end of the push rod coupling 50 and is secured thereto by set screw 55. The lower end 54b of the lower push rod 54 extends below the lower end 39b of the lower torque tube. The lower portion of the lower push rod 54 is threaded, of a form suitable for converting rotary motion into linear motion. The thread can be of various forms, such as Acme general purpose, square, Whitworth or unified, and can be single or multiple start. The Acme general purpose thread is especially useful for the present searchlight control mechanism, in part because it can be obtained in a thread design that will be self-locking so as to thereby eliminate the need for additional locking elements to secure the lower push rod, push rod coupling or upper push rod against undesired movement. An 8 thread/inch, double pitch Acme thread has been found to be particularly appropriate for the lower push rod 54.

A threaded nut 60 is provided that has a central bore 61 formed with threads to mesh with the threads on the lower push rod 54. The threaded nut 60 includes a first hub portion 62, a radially-extending thrust flange 63, and a second hub portion 64. The thrust flange 63 of the threaded nut butts against the end surface of the lower torque tube 39 and its first hub portion 62 fits inside the lower torque tube when the nut 60 is threaded onto the lower push rod 54 in its final operational position.

FIG. 2 illustrates a lever-gear control unit 65 at the lower end of the searchlight. The lever-gear control unit 65 includes a housing 66 that is attached to the lower end portion 39b of the lower torque tube. The housing has a split collar 67 extending about the lower torque tube; a bolt 78 (see FIG. 1) is inserted through apertures 68 formed in each arm of the collar 67 and tightened in order to secure the housing 66 in the desired position. The handle 69 of the control unit is secured to a shaft 70 journalled within the housing in sleeve bearings 71 and 72. Bevel gear 73 is attached to the inner end of the shaft 70 by means of set screw 74 and meshes with a mating bevel gear 75. The bevel gear 75 has a central bore; the second hub portion 64 of the threaded nut 60 fits into the central bore of the bevel gear 75, and the two elements are secured together by set screw 76. The housing 66 of the control unit has an internal annular shoulder 77 that butts against the thrust flange 63 of the threaded nut 60 when the nut is threaded onto the threaded portion of the lower push rod 54 into its final operational position. The threaded nut 60 is thus restrained against axial movement by reason of the contact between one side of its thrust flange with the bottom end surface of the lower torque tube 39 and the contact between the opposite side of the flange and the shoulder 77. The lower end of the housing 66 may include an aperture closed by a plug 79; users who desire to add a supporting shaft under the control unit 65 can remove the plug and insert one end of a supporting shaft into the aperture. The lever-gear control unit 65 can be supplied as an integrated unit including the control shaft 70, bevel gears 74 and 75, and threaded nut 60 arranged in the housing 66; installation is readily accomplished by threading the nut 60 onto the lower-push rod 54 to its final position and then tightening the split collar 67 about the lower torque tube.

The control of the positioning of the searchlight as described to this point is as follows. Twisting motion (i.e. rotation in the vertical plane) of the handle 69 of the lever-gear control unit 65 in one direction is transmitted through the bevel gears 73 and 75 to cause rotation of the threaded nut 60. This motion is transmitted to move the lower push rod 54 axially so that the three-element push rod assembly consisting of the lower push rod 54, push rod coupling 50 and upper push rod 46 will move in the vertical direction; this causes the elevation yoke 20 to position the searchlight in elevation by pivoting the light housing about the pivot pins 17. Twisting of the handle 69 in one direction will raise the searchlight and twisting it in the opposite direction will lower the searchlight. To move the searchlight in azimuth, the handle 69 is rotated in the horizontal plane and this motion is transmitted to the lower torque tube 39 and the upper torque tube 34 so as to rotate the flange 30 and thence the azimuth yoke 3.

Horizontal rotation of the light is preferably limited to prevent wrapping of the electric wire 9 around the light, with about 400 degrees of rotation being suitable for most installations. Various devices can be used for this purpose, such as the stop ring 82 mounted inside the pedestal 4 as illustrated in FIGS. 2 and 3. The stop ring is rotatably mounted about the upper torque tube 34 and includes a depending tab 83 (FIG. 2) and an arcuate plate portion 84 having stops 85 and 86. An internal rib 87 is formed as part of the pedestal 4. The upper set screws 41 are elongated as shown in FIGS. 2 and 3 so as to have an end portion that can engage the tab 83 of the stop plate. As the upper torque tube is rotated, a set screw 41 will rotate the stop ring upon engagement with the tab 83, and when either stop 85 or stop 86 contacts the rib 87 rotation of the light will be stopped in one direction. FIG. 3 shows the limit of counterclockwise rotation, looking upwards toward the bottom of the pedestal, in which the set screw 41a has moved the tab 83 to about the 9 o'clock position and the stop 85 is in contact with the rib 87; further counterclockwise movement is now prevented. The rib 87 has a notched portion to allow movement of the set screws 41 past the rib. The allowable angular rotation of the light is established by the angle between the set screws and the angle between the stops 85 and 86 of the stop plate. Vertical downward movement of the searchlight light may also be limited, and we show a limit pin 88 that extends through the upper push rod for this purpose.

(b) Description of FIG. 4

Some searchlight users will want a wheel control unit on the light instead of the lever-gear unit 65 shown in FIGS. 1–3. This can be readily accomplished with the construction of the present invention.

Referring now to FIG. 4, an azimuth wheel 90 is secured to the bottom of the lower torque tube 39 with set screw 91. The wheel 90 includes an annular shoulder 92 that fits about one side of the thrust flange 63 of the threaded nut 60. The opposite side of the nut 60 butts against the bottom end surface of the lower torque tube 39. The nut is thereby axially-restrained, with its first hub portion 62 inside the hollow lower torque tube. An elevation wheel 93 is secured to the second hub portion 64 of the threaded nut, as by set screw 94.

Rotation of the elevation wheel 93 will rotate the threaded nut 60 and result in linear movement of the lower push rod 54 to produce vertical reciprocation of the three-element push rod assembly formed of the lower push rod 54, push rod coupling 50 and upper push rod 46 to thereby control elevation of the searchlight in the same manner as described above in connection with lever-gear unit 65. Rotation of the azimuth wheel 90 causes the lower torque tube 39 and upper torque tube 34 to rotate the searchlight horizontally, also as described above with respect to the lever-gear control unit.

(c) Description of FIG. 5

Moreover, some users will not want either the lever-gear control unit of FIGS. 1–3 or the wheel control unit shown in FIG. 4. In such instances, the lever control unit 100 illustrated in FIG. 5 can readily be installed on the searchlight.

The threaded lower push rod 54 of the previous embodiments is replaced with an unthreaded lower push rod 54d that is inserted into the lower recess 52 of the push rod coupling 50 and retained in position by set screw 55. A bracket 101 is secured to the bottom portion of the lower torque tube 39, the bracket having split collar 102 consisting of a pair of arms extending about the lower torque tube and bolted together to secure the bracket in position as described previously in connection with the housing 65. The bracket 101 includes a pair of depending spaced pivot arms 103 having their lower ends spaced from the lower push rod 54d. A lever 104 is pivoted between the pivot arms 103 along pin 105 located at an intermediate portion of the lever. One end of the lever 104 has a handle 106 and the opposite end of the lever attached to the lower push rod 54d by means of plates 107 on each side of the lever and lower push rod that are connected to both elements by pins 108. A bushing 109, such as one having a metal outer shell and inner plastic layer, is press-fit into the bracket 101 to have a sliding fit with the lower push rod 54d.

To control elevation of the searchlight, the lever 104 is moved up or down in the vertical direction to reciprocate the three-element push rod assembly consisting of the lower push rod 54d, push rod coupling 50, and upper push rod 46. When the handle 106 of the lever control unit 100 is moved downwardly so that the level is in its lower dashed line position of FIG. 5, the elevation of the searchlight will be lowered. Azimuth control of the searchlight is achieved by rotating the lever 104 in the horizontal plane, which motion is transmitted to the lower torque tube 39 and upper torque tube 34 to turn the searchlight horizontally as described above in connection with FIGS. 1–4.

Industrial Applicability

The searchlight control mechanism described above has a number of advantages that make it particularly useful for maritime applications as well as land-based uses in which a searchlight controllable in azimuth and elevation is required.

As has been fully described, the new searchlight control mechanism can be readily accommodated to either a lever control mechanism, lever-gear control mechanism, or a wheel control mechanism. The manufacturer can provide either selected control mechanism with minimum requirements for additional parts. Furthermore, a distributor or field representative can also easily interchange from one control mechanism to the other at the site of installation, or even after the original installation has been made. This allows a user to change the control mechanism at a later date if so desired, without requiring any significant reconstruction of the searchlight or without replacing the entire searchlight unit itself. This latter feature enables the user to change the control mechanism if a new operator should prefer a different mechanism than that originally installed. In this connection, the lever-gear control unit, such as that illustrated as unit 65 in the foregoing description, is supplied as a preassembled unit consisting of the control shaft, bevel gears and the threaded nut in position in the housing, so that an installer can easily thread the nut onto the lower push rod and then secure the control mechanism in its final position.

Another advantageous feature of the control mechanism described above is the fact that it can be readily adapted for positioning the control mechanism at any selected height. Because the control system described above employs two torque tubes for controlling the azimuth positioning of the searchlight, only the lower torque tube needs to be selected for the length required for the height of the control mechanism. Similarly, only the push rod coupling of the three-element inner push rod assembly needs to be selected for length in order to have the control mechanism at the required height. The assembly comprising the searchlight, azimuth and elevation yokes, supporting base, and upper torque tube and upper push rod forms a modular unit that can be used within any installation regardless of the position of the control mechanism or the type of control mechanism. This is made possible because of our present searchlight control mechanism using linear movement of the three-element push rod assembly for all three types of control mechanisms. This provides the manufacturer with significant advantages in that he can build an inventory of the modular portion and need only select the length of the lower torque tube and push rod coupling to customize the unit for a specific installation and interchange elements at the control end of the units to install either of the three control mechanisms. Also, both the lower torque tube and push rod coupling can be altered or changed in the field so that changes in the height first selected for the control mechanism can be easily made at any time.

The several advantages of the present construction have been provided with a control mechanism that does not utilize externally-exposed operating elements. Thus, the control mechanism described herein does not require the use of a pinion gear or curved or straight rack that is mounted outside to be exposed to the weather, unlike the prior art systems previously discussed.

There has thus been described a new and useful searchlight control mechanism capable of meeting the objects of this invention as set out above. It is anticipated that other skilled in the art of searchlight design and construction will be able to devise changes to the specific embodiments described above without departing from the true spirit and scope of this invention.

What is claimed is:

1. In a searchlight control system of the type including a support base having a pedestal for attachment to a structural element on which a searchlight is to be mounted and a rotatable member supported on the pedestal, an azimuth yoke attached to the rotatable member for rotation therewith, a searchlight pivotally supported in the azimuth yoke, an elevation yoke attached to the searchlight, and a control mechanism operatively associated with the azimuth yoke and the elevation yoke for positioning the searchlight, the improvement in which the control mechanism comprises:
  (1) an upper torque tube journalled within the pedestal and having a first end attached to the rotatable member of the support base and a second end extending from the pedestal of the support base,
     the upper torque tube consisting of a hollow tubular shaft;
  (2) an upper push rod positioned inside the upper torque tube and having a first end attached to the elevation yoke and a second end extending from the pedestal of the support base;
  (3) a lower torque having a first end connected to the upper torque tube and a second control end remote therefrom,
     the lower torque tube consisting of a hollow tubular shaft;
  (4) a push rod coupling having a first end connected to the upper push rod and a second end remote therefrom;
  (5) a lower push rod having a first end connected to the second end of the push rod coupling and a second control end remote therefrom; and
  (6) control means operatively connected to the control end of the lower torque tube and the control end of the lower push rod to rotate the lower torque tube to position the searchlight in azimuth and to reciprocate the lower push rod to position the searchlight in elevation.

2. A searchlight control system according to claim 1, wherein:
  (a) the lower push rod has a portion with threads, and
  (b) the control means includes
    (i) a threaded nut having an internal bore with threads that mesh with the threads on the lower push rod, and
    (ii) gears for rotating the threaded nut to reciprocate the lower push rod positioning the searchlight in elevation.

3. A searchlight control system according to claim 2, wherein:
  the threaded nut has a first hub portion, a second hub portion, and a radially-extending thrust flange between the first and second hub portions, the threaded nut being arranged with
    (i) the first hub portion within the lower torque tube,
    (ii) the thrust flange between the end of the lower torque tube and a portion of the control means to thereby restrain the threaded nut against axial movement, and
    (iii) the second hub portion carrying a gear for rotation of the threaded nut.

4. A searchlight control system according to claim 3, wherein:
  the control means includes a housing, a control shaft journalled in the housing, a first bevel gear on the control shaft and a second bevel gear on the second hub portion of the threaded nut, whereby rotation of the control shaft in the vertical plane rotates the threaded nut for reciprocation of the lower push rod.

5. A searchlight control system according to claim 4, wherein:
  the housing of the control means includes a portion secured to the control end of the lower torque tube for positioning the searchlight in azimuth upon rotation of the control means in the horizontal plane.

6. A searchlight control system according to claim 1, wherein:
  (a) the lower push rod has a portion with threads, and
  (b) the control means includes
    (i) a threaded nut having an internal bore with threads that mesh with the threads on the lower push rod,
    (ii) a first wheel for rotating the threaded nut to reciprocate the lower push rod to position the searchlight in elevation, and
    (iii) a second wheel for rotating the lower torque tube to position the searchlight in azimuth.

7. A searchlight control system according to claim 6, wherein:
  the threaded nut has a first hub portion, a second hub portion, and a radially-extending thrust flange between the first and second hub portions, the threaded nut being arranged with
    (i) the first hub portion within the lower torque tube,
    (ii) the thrust flange between the end of the lower torque tube and an annular shoulder of the second wheel to restrain the threaded nut against axial movement, and
    (iii) the second hub portion carrying the first wheel for rotation of the threaded nut.

8. A searchlight control system according to claim 1, wherein:
  the control means includes a bracket having a portion secured to the control end of the lower torque tube and a lever pivotally supported in the bracket and connected to the control end of the lower push rod, the lever being operative to reciprocate the lower push rod for positioning the searchlight in elevation upon movement in the vertical plane and operative to rotate the lower torque tube for positioning the searchlight in azimuth upon movement in the horizontal plane.

9. A searchlight control system according to claim 1, 2, 3, 4, 5, 6, 7 or 8, wherein:

the push rod coupling has a recess opening onto its first end and a recess opening onto its second end, the upper push rod is inserted into the former such recess and the lower push rod is inserted into the latter such recess, and removable connector means operatively secure the upper and lower push rods to said coupling.

10. A searchlight control system according to claim 1, 2, 3, 4, 5, 6, 7 or 8, wherein:

an annular coupling ring surrounds the second end of the upper torque tube and the first end of the lower torque tube, and removable connector means secure the upper and lower torque tubes to said coupling ring.

11. A searchlight control system according to claim 1, 2, 3, 4, 5, 6, 7 or 8, further including:

a collar member extending about the lower torque tube and having an internal groove, a locking element threaded in the collar and into the groove, and an annular band of plastic material within said groove between the lower torque tube and the locking element.

12. In a searchlight control system having a control mechanism for positioning the searchlight in azimuth and elevation that includes an outer tubular shaft, the improvement comprising:

a collar member extending about the tubular shaft and having an internal groove, a locking element threaded in the collar and extending into the groove, and an annular band of plastic material within the groove between the tubular shaft and the locking element.

* * * * *

UNITED STATES PATENT AND TRADEMARK OFFICE
CERTIFICATE OF CORRECTION

PATENT NO. : 4,419,721
DATED : December 6, 1983
INVENTOR(S) : Brian R. Gregoire, et al It is certified that error appears in the above—identified patent and that said Letters Patent is hereby corrected as shown below:

Col. 9, line 49, after "torque" insert -- tube --.

Signed and Sealed this

Thirteenth Day of March 1984

[SEAL]

*Attest:*

GERALD J. MOSSINGHOFF

*Attesting Officer*     *Commissioner of Patents and Trademarks*